United States Patent
Cui et al.

(10) Patent No.: US 12,088,488 B2
(45) Date of Patent: Sep. 10, 2024

(54) RADIO NETWORK NODE, USER EQUIPMENT AND METHODS PERFORMED THEREIN

(71) Applicant: Telefonaktiebolaget LM Ericsson (PUBL), Stockholm (SE)

(72) Inventors: Tao Cui, Upplands Väsby (SE); Mikael Wittberg, Uppsala (SE); Martin van der Zee, Malmö (SE); Ali Nader, Malmö (SE); Petter Blomberg, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 306 days.

(21) Appl. No.: 17/626,689

(22) PCT Filed: Jul. 2, 2020

(86) PCT No.: PCT/SE2020/050696
§ 371 (c)(1),
(2) Date: Jan. 12, 2022

(87) PCT Pub. No.: WO2021/010881
PCT Pub. Date: Jan. 21, 2021

(65) Prior Publication Data
US 2022/0247656 A1    Aug. 4, 2022

Related U.S. Application Data

(60) Provisional application No. 62/874,011, filed on Jul. 15, 2019.

(51) Int. Cl.
*H04L 43/0894* (2022.01)

(52) U.S. Cl.
CPC .................. *H04L 43/0894* (2013.01)

(58) Field of Classification Search
CPC .................................................. H04L 43/0894
USPC ............................................................ 370/252
See application file for complete search history.

(56) References Cited

U.S. PATENT DOCUMENTS

2013/0301500 A1   11/2013  Koc et al.
2019/0090181 A1*   3/2019  Iyer ...................... H04W 24/08

OTHER PUBLICATIONS

3GPP TSG RAN WG2 Meeting #106; Reno, Nevada, USA; Source: Intel Corporation; Title: Report on [105bis#28] [NR/Power Savings] UE assistance (R2-1906426)—May 13-17, 2019.
PCT International Search Report issued for International application No. PCT/SE2020/050696—Aug. 24, 2020.
PCT Written Opinion of the International Searching Authority issued for International application No. PCT/SE2020/050696—Aug. 24, 2020.

* cited by examiner

*Primary Examiner* — Gbemileke J Onamuti
(74) *Attorney, Agent, or Firm* — Baker Botts L.L.P.

(57) ABSTRACT

Embodiments herein may relate to a method performed by a UE for handling communication in a wireless communication network. The UE transmits an indication to a radio network node, indicating a type of data traffic for communication of the UE, wherein the type is related to a level of performance.

20 Claims, 10 Drawing Sheets

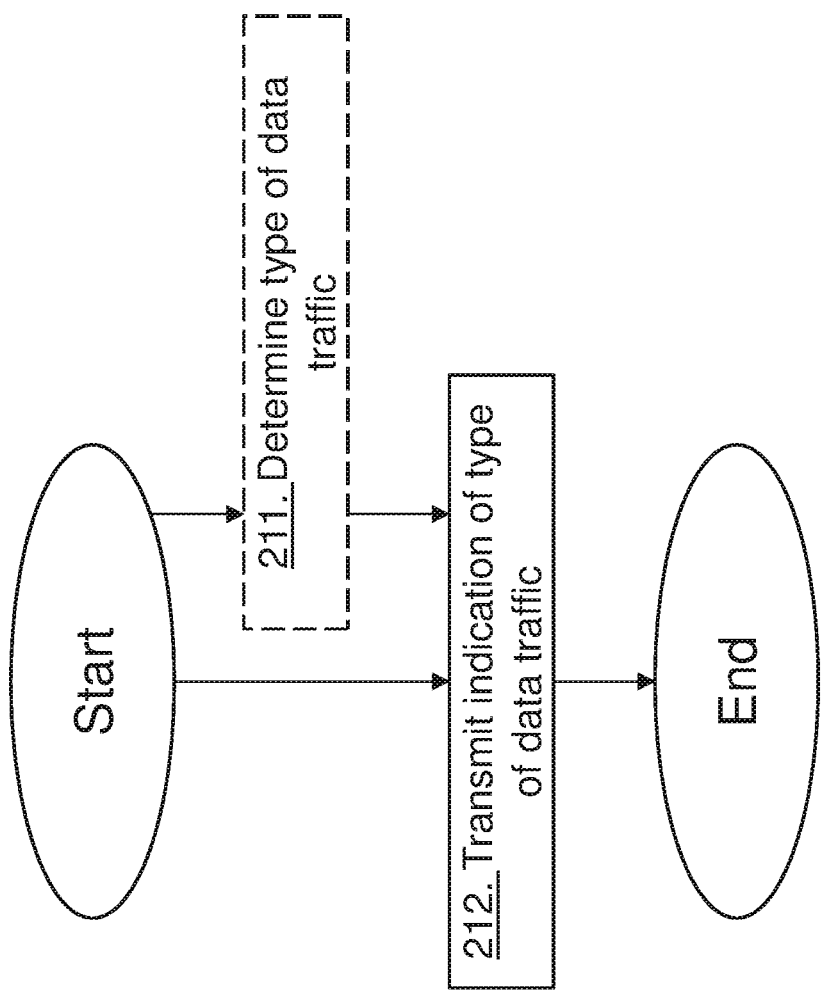

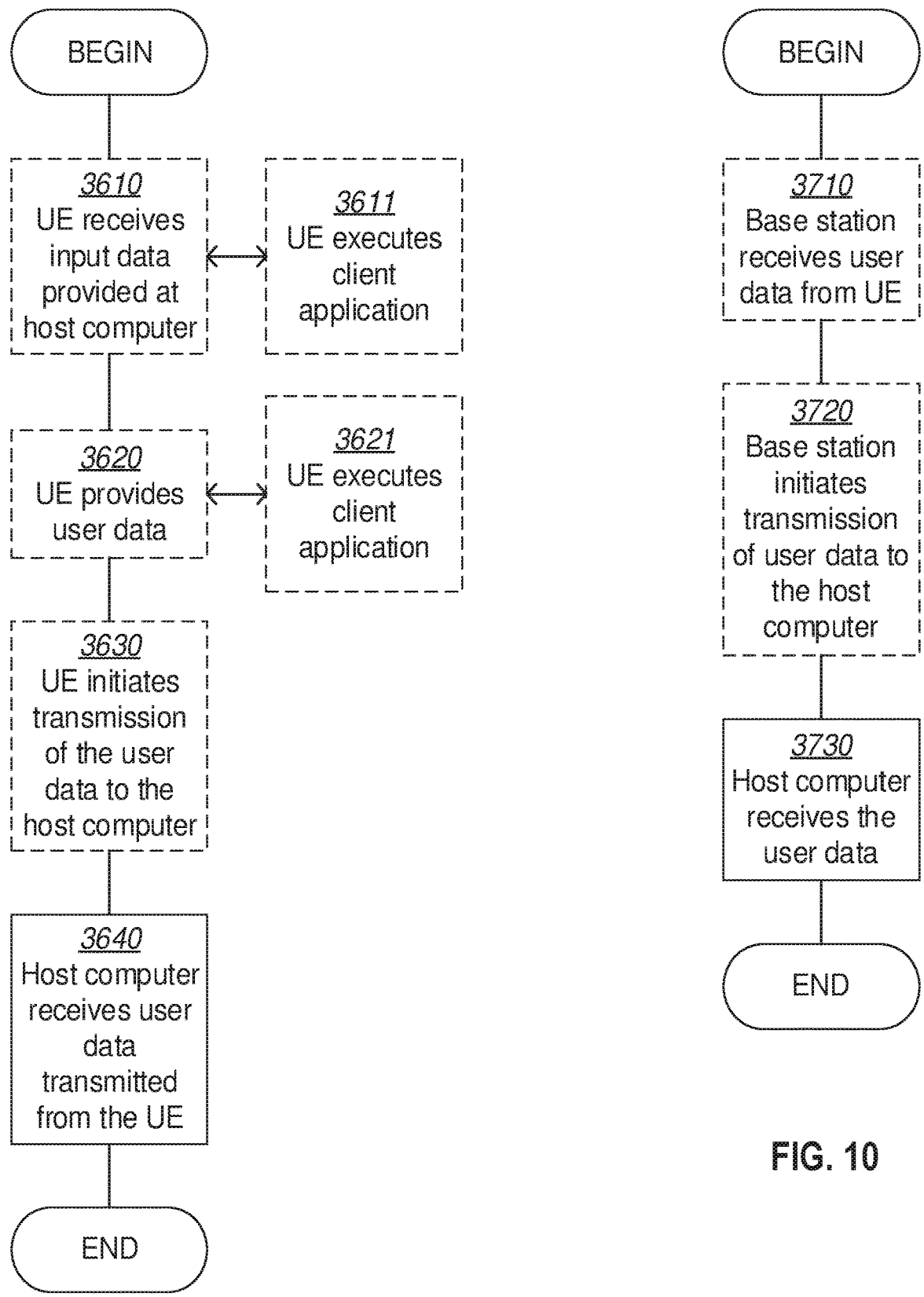

RADIO NETWORK NODE, USER EQUIPMENT AND METHODS PERFORMED THEREIN

PRIORITY

This nonprovisional application is a U.S. National Stage Filing under 35 U.S.C. § 371 of International Patent Application Serial No. PCT/SE2020/050696 filed Jul. 2, 2020 and entitled "Radio Network Node, User Equipment and Methods Performed Therein" which claims priority to U.S. Provisional Patent Application No. 62/874011 filed Jul. 15, 2019 both of which are hereby incorporated by reference in their entirety.

TECHNICAL FIELD

Embodiments herein relate to a radio network node, a user equipment (UE) and methods performed therein for communication. Furthermore, a computer program product and a computer readable storage medium are also provided herein. In particular, embodiments herein relate to enabling or handling communication of the UE in a wireless communication network.

BACKGROUND

In a typical wireless communication network, user equipments (UE), also known as wireless communication devices, mobile stations, stations (STA) and/or wireless device, communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB" (NB) or "eNodeB" (eNB), "gNodeB" (gNB). A service area or cell is a geographical area where radio coverage is provided by the radio network node. The radio network node communicates over an air interface operating on radio frequencies with the UE within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New radio (NR) is a new radio access technology being standardized in 3GPP.

There are some existing methods for which power saving in UE can be achieved, and these methods include the usage of Power Preference Indication (PPI) and RAI (Release Assistance Indication).

In LTE a UE can support PPI signalling, and this means that the UE can inform the network whether it will require normal power mode (normal) or if it would prefer to be handled in lower power mode (lowPowerConsumption). If the UE sets the PPI bit to lowPowerConsumption the UE prefers a configuration primarily optimised for power saving. Hence, by using the PPI, a UE can signal to the network that it prefers to be handled where the required power is lower than the normal handling. Note that in the current specification, the PPI signalling method needs to be configured by the network (using the powerPrefIndicationConfig information element) before it can be used by the UE. The UE indicates support for power preference indication with the UE capability powerPrefInd. Furthermore a prohibit timer is configured to avoid excessive signalling from the UE, i.e. only when the prohibit timer is not running and the last signaled value is different from the current one, the UE may signal its preferred power mode (powerPrefIndicationTimer={0, 0.5, 1, 2, 5, 10, 20, 30, 60, 90, 120, 300, 600} seconds). When powerPrefIndicationTimer is zero the UE may send the preferred power mode every time it changes.

For NB-IoT and LTE BL (Bandwidth reduced Low complexity) UEs, the network can configure RAI (release assistance indication) to be active, and this means that the UE can indicate to the network when it has no more data to send or receive in the "near future". This is achieved by using the BSR MAC control element, and is used as follows according to the specification in section 5.4.5 in the MAC specification (36.321):

For NB-IoT or BL UEs:
  if rai-Activation is configured, and a buffer size of zero bytes has been triggered for the BSR, and the UE may have more data to send or receive in the near future:
  cancel any pending BSR.

What this means that if the UE includes a BSR with zero bytes as the UL data buffer size, the network will interpret this as if the UE has no more data to send within the "near future", where near future is UE implementation specific. This alternative interpretation of BSR=0 is used, when the UE has indicated support of RAI (rai-Support) and the NW has configured RAI in the UE(rai-Activation). If the UE has no data in the UL data buffer but expects more transfer within the near future, the UE should not include a BSR at all in the transport block.

At radio resource control (RRC) connection setup, the UE will initially not have any radio resources allocated at all, but later the UE will be allocated with more radio resources that are decided by network policy and algorithm. Typically, the UE initiates an RRC connection setup by sending a Random Access preamble (called MSG1), the network will then respond with Random Access Response (called MSG2), and the UE will continue to send the RRC connection Request message or other corresponding message to enter RRC connected mode (called MSG3). Until now no radio resources have been allocated for the UE, but in the next RRC message sent by the network to the UE (typically called MSG4) some radio resources may initially be allocated for the UE for mainly signalling transmission. Later on, in the RRC connection setup, more radio resources may be allocated, and typically next RRC message sent to the UE after MSG4 is informally referred to as MSG6.

A problem in these wireless communication networks is to minimize the usage of radio resources in the cases when the radio resources are not needed. One example of a radio resource is the usage of dual connectivity (DC) where radio link connections are setup in more than one node, such as using EN-DC. This kind of configuration requires a lot of measurements performed by the UE and the network, and it requires a lot of signalling to convey the measurement information and to perform the needed configurations. Once the dual connectivity has been setup and is in use, it is also costly to maintain, because there is a need to continue with measurements on both connected legs and the power usage needed by the UE will increase. Note that this increase in the usage of radio resource and usage of power is needed even in the case when the UE will just send or receive some very small amount of data.

One may argue as a counter argument that the network should only setup extra radio resources when it notices that the UE will send or receive a lot of data, and when the UE is inactive the network should be able to release the extra radio resources. However, there are a number of problems with this approach, such as:

One problem is that if the network waits to setup extra radio resources and the UE has a lot of data to send or receive, it will take longer time until the extra radio resources could be used by the UE for handling traffic, and hence the performance such as end-2-end throughput will be degraded.

Another problem is that if the UE only has a moderate amount of data to send or receive and if the benefit for the end-2-end throughput will not be that big for a specific UE, it may have a much bigger impact on the load on the allocated base radio resource. If we take DC as an example, the load on the primary serving cell (PScell) will be much higher if all UEs will use the PScell for a longer time period and only switch to the LTE-NR-DC (EN-DC) configuration and start to use the NR cell at a later point in time. This higher load on the PScell will degrade the radio system as a whole and give worse performance, compared with if the UEs could be configured with using EN-DC early on in the RRC connection setup and hence distribute the load on more cells.

Yet another problem is that for some traffic cases it will be common that bursts of large chunks of data will be sent by the application server to the UE, and this is common for instance in video streaming where the video frames are sent periodically as big chunks of data. In this case there is very little time to setup more radio resources to handle the big burst of data that is sent by the application server. If we once again take EN-DC as an example, the network should not really release dual connectivity while the UE is inactive between the data bursts (which typically can vary between 1 and 5 seconds) because if the network would release the dual connectivity configuration the next following data burst cannot be handled as efficiently since EN-DC is no longer setup and it will take some time to configure it.

Note that even though the usage of dual connectivity has been mentioned above in the example of using radio resources, there are also other radio resources for which the same issues apply, and this includes the number of serving cells needed for carrier aggregation (CA), the bandwidth used for the carrier bandwidth parts in NR (BWP), the number of physical uplink control channel (PUCCH) resources used, the number of measurements setup for various reference symbols, and many other type of radio resources.

If too much radio resources are allocated for a UE, it means that less radio resources are available for other UEs, resulting in lower capacity in the network to handle many UEs, and it may also result in a higher energy requirement from the network to handle the UE. From the UE point of view, when more resources are configured, it will often require more energy, and if the UE only has some small data to send or receive, the energy needed per bit of transfer will then be unnecessary high. As an example, for a UE operating in EN-DC setup, the addition of a single NR cell in e.g. frequency range 1 (FR1) as a secondary cell may increase UE power consumption up to 40%.

If too little radio resources are allocated for the UE, the end-2-end throughput may be reduced and increased delay causes bad user experience when the UE needs to transfer a large amount of data.

SUMMARY

The overall problem is therefore that the network cannot always know the optimal amount of radio resources to allocate for a UE at a certain time. One important case when the network would need to know how much radio resources to allocate for a UE is directly after RRC connection setup, because then if the UE only has some short burst of data to send or receive, or if the data to send or receive has lower priority, the network should in many cases only need to setup a minimum set of radio resources.

If a UE only needs to send or receive background traffic for which the data rate does not matter there is no standardized way where the UE can indicate this to the network at RRC connection setup. For the network this means that it does not know at RRC connection setup or at RRC resume if the UE only intends to send or receive background traffic for which the latency requirements can be relaxed or whether the UE needs to send or receive data for which the latency should be kept as short as possible. An additional complication is that also for cases when the UE has only background traffic to send or receive for which the latency can be relaxed but where the amount of data to send or receive is rather big, it may still be beneficial to allocate a lot of radio resources for the UE because this may in the end result in the most optimal utilization of the radio resources. Hence, for some cases where only background traffic is used, it may be better to allocate a lot of radio resources for a UE that it can use for a short time period, rather than allocating a small amount of radio resources for the UE that the UE needs to use for a longer time period.

One additional disadvantage when only allocating few radio resources for the UE is that for some cases the distribution of load within the network will not be as optimal compared with the case when many radio resources are allocated for the UE. For instance, in a DC or a CA configuration the network will be able to schedule the UE on two or more cells, and if one of the cells is heavily loaded the scheduler will mostly use the other cells for the traffic. If a UE is only configured with one cell for handling the traffic then there is a risk that this single cell will be a bottleneck if many UEs happens to be using this cell for the data traffic.

An object of embodiments herein is to provide a mechanism for improving, in an efficient manner, performance of the wireless communication network e.g. allocating resources efficiently in the wireless communication network.

According to an aspect the object is achieved by providing a method performed by a UE for handling communication in a wireless communication network. The UE transmits to a radio network node, an indication of a type of data traffic (or data) for communication of the UE, e.g. what type the UE buffers for transmission or is expecting to receive. The type is related to a level of performance such as level of latency requirement.

According to another aspect the object is achieved by providing a method performed by a radio network node for handling communication for a UE in the wireless communication network. The radio network node receives from the UE, an indication of a type of data traffic (or data) for communication of the UE. The type is related to a level of performance such as level of latency requirement. The radio network node further allocates one or more radio resources for the UE based on the received indication.

According to yet another aspect the object is achieved by providing a radio network node and a UE configured to perform the methods herein.

That is, a UE for handling communication in a wireless communication network is provided. The UE is configured to transmit to a radio network node, an indication of a type of data traffic (or data) for communication of the UE, e.g. what type the UE buffers for transmission or is expecting to receive. The type is related to a level of performance such as level of latency requirement. A radio network node is provided for handling communication for a UE in the wireless communication network. The radio network node is configured to receive from the UE, an indication of a type of data traffic (or data) for communication of the UE. The type is related to a level of performance such as level of latency requirement. The radio network node is further configured to allocate one or more radio resources for the UE based on the received indication.

It is furthermore provided herein a computer program product comprising instructions, which, when executed on at least one processor, cause the at least one processor to carry out any of the methods above, as performed by the UE or the radio network node, respectively. It is additionally provided herein a computer-readable storage medium, having stored thereon a computer program product comprising instructions which, when executed on at least one processor, cause the at least one processor to carry out the method according to any of the methods above, as performed by the UE or the radio network node, respectively.

To optimize the usage of network resources and to minimize the usage of UE energy, embodiments herein propose that the UE signals to the radio network node, e.g. at the beginning of an radio resource control (RRC) connection setup or at an RRC connection resume, that the UE intends to transfer data of a first type, wherein type is related to a level of performance, e.g. data needing a low rate connection with relaxed latency requirements. This information sent by the UE allows the radio network node to use much less radio resources, for instance not using dual connectivity and not using carrier aggregation in case the indication is that the data is of a type of a level of performance below a threshold, e.g. level 1 equals normal latency requirement and level 0 equal lower latency requirement.

Herein is the term "background traffic" used for indicating a traffic session for which the UE can accept relaxed latency requirements, and the term "foreground traffic" will be used for indicating a traffic session for which normal latency requirements apply as configured by the current quality of service setting, such as Quality of service Class Identifier (QCI). The intention may be that if the UE has not explicitly indicated that it intends to use background traffic, it means that foreground traffic is assumed.

Embodiments herein also allow a UE in e.g. RRC connected state to, at any time, signal the network, i.e. the radio network node, indicating that the UE at the current time only has background traffic, i.e. data of the first type, to send or receive. It is also proposed that the opposite signalling is supported, which means that the UE is allowed to at any time signal the network indicating that the UE from now on has foreground traffic, i.e. another example of data of a type, to send or receive.

It is proposed that it is up to UE implementation to decide what type of data or traffic is background and what type of traffic is foreground traffic. A UE may for instance decide that if the screen is on, the UE will always indicate foreground traffic because then the energy usage of the radio part is insignificant compared with the energy used by the screen. In a similar way, the UE may evaluate based on the screen usage, and other sensors it has, whether the UE can indicate to the network that it has only background traffic.

When the radio network node is informed by the UE that the UE only intends to use background traffic, the radio network node may reduce the number of configured radio resources, e.g. the radio network node may configure the UE with discontinuous reception (DRX) settings allowing longer sleep times, it may ensure that UL pre-scheduling is not used, and it may configure the UE to use less amount of physical ulink control channel (PUCCH) resources.

When the radio network node is informed by the UE that the UE intends to use foreground traffic, the radio network node may increase the amount of radio resources assigned to the UE, the radio network node may configure the UE with a DRX setting that allows less sleep time, it may start UL pre-scheduling, and it may configure the UE to use more PUCCH resources.

To provide the indication, e.g. the 'background traffic indication', when the UE is in connected state, it is proposed either to use a new medium access control—control element (MAC CE) or to extend the existing RAI mechanism. Currently the RAI means that the UE does not expect any more data to be sent or received within the near future, and hence wants to get released from an RRC connection. But in certain scenarios, it may be the case that the UE needs to continue to send or receive background data for which there is a relaxed latency requirement but the connection needs to be still kept. Using this more refined signalling, the radio network node may reduce the amount of radio resources assigned to the UE when the radio network node gets informed by the UE that it does not need a high data rate.

In addition to only assigning a small set of radio resources for a UE that has indicated that it intends to send background traffic, the radio network node is permitted to schedule the UE with lower priority than if the UE would not have signaled this indication. This permission given by the UE may be important because if the radio network node would have to schedule the UEs with background traffic with normal priority, the load in the network may be increased due to that the UEs are allocated to fewer cells (less radio resources) and by reducing the scheduling priority for UEs that only has background traffic to send or receive, the UEs which are using foreground traffic will avoid being impacted by higher load.

If the UE has signaled that it only intends to use background traffic, embodiments herein also propose that the radio network node may still be able to allocate a lot of radio resources for the UE if the radio network node gets informed that the UE has a lot of data to send or receive. This information about the data volume may be achieved in different ways, such as by looking at the Buffer Status Report (BSR) sent by the UE, looking at the amount of data that is buffered in the transmitter queues in the network to be sent to the UE, and by monitoring the current scheduling rate both in uplink and downlink for the UE.

Embodiments herein enable the radio network node to better divide the available radio resources, such as frequency, time, symbols, between different UEs that are served, and the radio network node will be able to allocate more radio resources to UEs that benefit from having it and allocate less radio resources to UEs that do not need more radio resources. Furthermore, embodiments herein enable to minimize the energy usage by the UE, because too much radio resources are not allocated for the UE if the UE does not need it and this reduces unnecessary active time for UE. Additionally, embodiments herein ensure that the energy usage by the radio network node may be minimized, because by reducing the allocation of radio resources to no more than what is actually needed, there will be no need to allocate any unnecessary resource, which will increase the required energy usage by the radio network node.

Embodiments herein may provide a win-win situation both for the UE and the network. When the UE signals e.g. background traffic it is not interested in the latency requirements, but the UE wants to ensure that the radio connection can use as little power as possible, and the radio network node may use the indication to better distribute the radio resources between the UEs and the radio network node may also reduce its own energy usage. This further leads to an improved performance of the wireless communication network using radio resources in a more optimal manner.

BRIEF DESCRIPTION OF THE DRAWINGS

Embodiments will now be described in more detail in relation to the enclosed drawings, in which:

FIG. 2B shows a method performed by a user equipment according to embodiments herein.

FIGS. 7 to 10 are flowcharts illustrating methods implemented in a communication system including a host computer, a base station and a user equipment.

DETAILED DESCRIPTION

Embodiments herein are described within the context of 3GPP NR radio technology (3GPP TS 38.300 V15.2.0 (2018-06)). It is understood, that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

Figure 1:
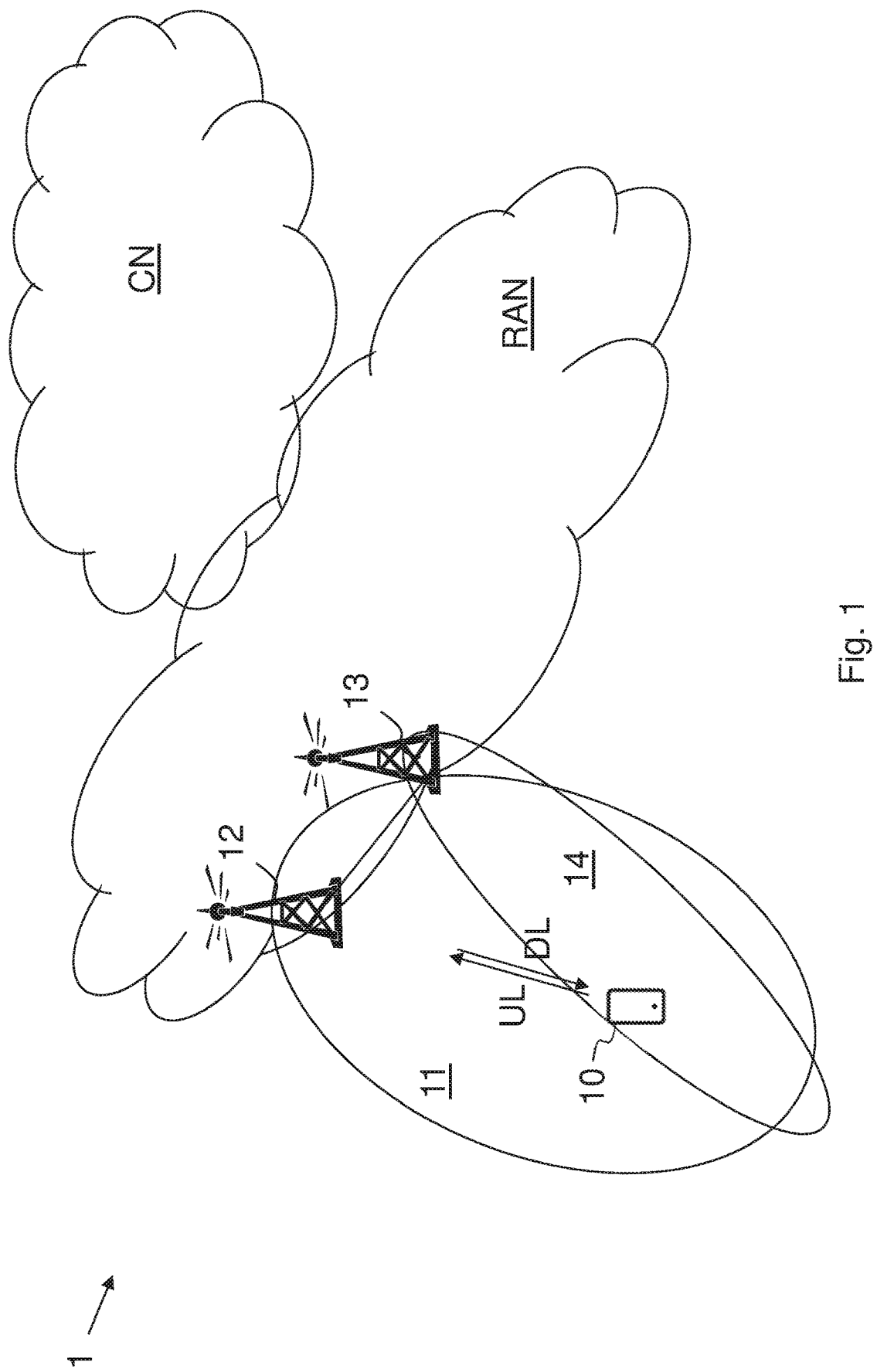
FIG. 1 shows a schematic overview depicting a wireless communication network according to a deployment of embodiments herein.

Embodiments herein relate to wireless communication networks in general. FIG. 1 is a schematic overview depicting a wireless communication network 1. The wireless communication network 1 comprises one or more RANs e.g. a first RAN (RAN1), connected to one or more CNs. The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a UE 10 such as a mobile station, a non-access point (non-AP) station (STA), a STA, a UE and/or a wireless terminal, are connected via the one or more RANs, to the one or more CNs. It should be understood by those skilled in the art that "UE" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a radio network node 12. The radio network node 12 is exemplified herein as a first radio network node or a first RAN node providing radio coverage over a geographical area, a first service area 11, of a first radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a UE 10 within the service area served by the radio network node 12 depending e.g. on the radio access technology and terminology used and may be denoted as a primary radio network node. The radio network node 12 may alternatively be denoted as a serving radio network node providing a primary cell for the UE 10.

The wireless communication network 1 comprises a second radio network node 13. The second radio network node 13 is exemplified herein as a second RAN node providing radio coverage over a geographical area, a second service area 14, of a second RAT, such as NR, LTE, UMTS, Wi-Fi or similar. The second radio network node 13 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a UE 10 within the service area served by the second radio network node 13 depending e.g. on the radio access technology and terminology used and may be denoted as a secondary radio network node. The radio network node 13 may alternatively be denoted as a serving radio network node providing a secondary cell, e.g. primary secondary cell, for the UE 10.

It should be noted that a service area may be denoted as cell, beam, beam group or similar to define an area of radio coverage. The first RAT may the same or different RAT as the second RAT.

Embodiments herein also allow the UE 10 to signal the radio network node 12 indication that the UE at the current time has data traffic of a type of e.g. a relaxed latency requirement such as background traffic. The radio network node 12 may then allocate radio resources such as release dual connectivity based on the indication leading to an efficient use of radio resources in the wireless communication network 1.

Figure 2A:
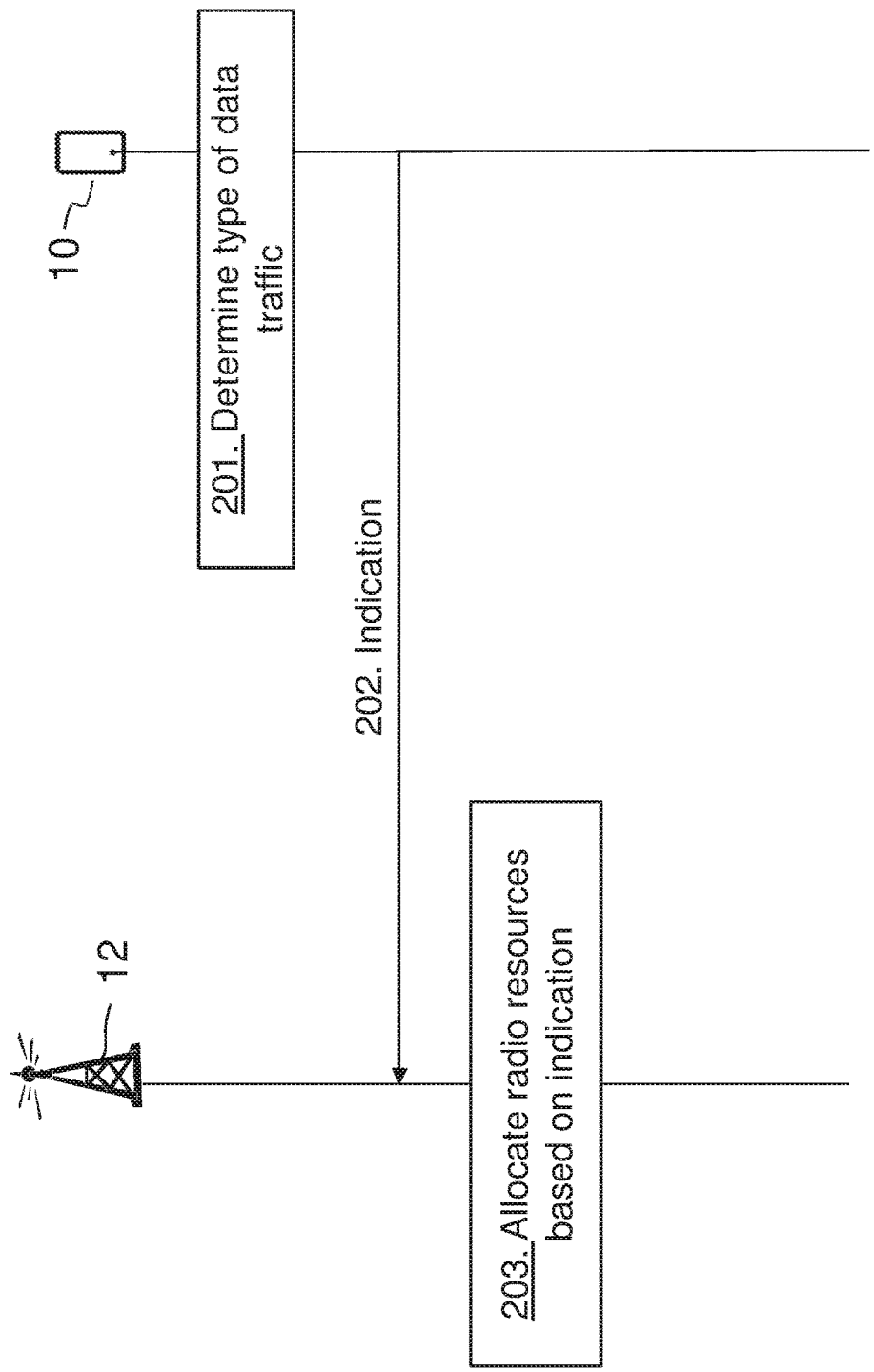
FIG. 2A is a combined signalling scheme and flowchart according of embodiments herein.

FIG. 2A is a schematic combined signalling scheme and flowchart depicting embodiments herein.

Action 201. The UE 10 may determine a first type of data traffic for communication of the UE 10. This may be based on data in a buffer at the UE 10 or a data of a service. Apart from applications that are running, the UE 10 may use a screen usage (based on UE internal sensors) to decide the type indication e.g. indicating the background or foreground traffic, to be provided to the radio network node 12.

Action 202. The UE 10 transmits an indication to the radio network node 12. The indication is an indication that the UE communicates with a type of data traffic for communication of the UE, wherein the type is related to a level of performance e.g. the first type of data traffic. The UE 10 may transmit the indication to the network early on in e.g. an RRC connection setup phase, either at RRC setup request or at RRC resume request, and this indication may inform the network that the UE 10 only intends to send or receive e.g. background traffic. The indication may be sent using a PPI signalling indication. The PPI signalling may be sent by the UE 10 before being configured by the radio network node 12 based on a network indication of allowing PPI signalling early, because the radio network node 12 may be able to receive the indication before it has had the opportunity to configure the PPI. The radio network node 12 may indicate allowing PPI in a broadcast message. The indication may be sent using a specific MAC CE or extended RAI. The UE 10 may send the indication at a time when the UE 10 has a lot of radio resources allocated but it considers that it no longer needs a lot of radio resources.

Action 203. The radio network node 12 allocates one or more radio resources for the UE 10 based on the indicated type of data traffic. When the radio network node 12 receives this indication, it may e.g. decide to minimize the amount of radio resources allocated for the UE 10. The indication may be referred to as a BackgroundTraffic indication when the indication indicates a latency requirement below a threshold e.g. a low latency requirement may indicate that the data may be delayed above a threshold. The radio network node 12 may schedule the UE with lower priority than normal if the UE 10 has signalled BackgroundTraffic indication. If the UE 10 sends a BSR indicating that the UE has a lot of data to transmit (above a threshold), the radio network node 12 may still decide to allocate a lot of radio resources for the UE even though the UE 10 has signaled BackgroundTraffic indication. When the radio network node 12 receives the BackgroundTraffic indication the radio network node 12 may not setup any carrier aggregated cells (only single cell), and if a carrier aggregation is already setup, the radio network node 12 may release the one or more aggregated cells and keep one cell. When the radio network node 12 receives the BackgroundTraffic indication the radio network node 12 may not setup dual connectivity, and if dual connectivity is already setup, the radio network node 12 may release dual connectivity. When the radio network node 12 receives the BackgroundTraffic indication, the radio network node 12 may set up dual connectivity but configures the DC in such manner that requires minimum radio activity from the UE and NW perspective. For example, the NR cell may be activated and put in a so-called dormant state, which is an LTE-SCell-dormant-state-alike type of operation where only measurements are carried out on an Scell, not requiring any physical downlink control channel (PDCCH) decoding from the UE. Or the power consuming Scell e.g. a NR cell, may be configured to operate in connected discontinuous reception (C-DRX), with a very short drx-OnDurationTimer (e.g. $\frac{1}{32}$ ms) and very long DRX cycle (e.g. 10240 ms). A "5G" icon may only be visible in case the UE 10 is connected to an NR cell. In case the radio network node 12 has possibility to configure multiple Scells, the radio network node 12 may configure the most UE-power friendly one, i.e. it may configure the UE 10 with the one SCell on the lowest possible band, e.g. FR1 rather than FR2, and configure minimum bandwidth (BW) on it.

When the UE 10 is connected to the radio network node 12 via NR and indicates BackgroundTraffic as the type of data traffic, and in case the UE 10 and the radio network node 12 or the second radio network node 13 are both capable of LTE communication and there is LTE coverage and resources available, the radio network node 12 may hand over the UE 10 to LTE if it is assumed to be less power consuming for the UE 10. The UE may send the indication to the radio network node 12 to inform the network that the UE from now on intends to send or receive foreground traffic. I.e. the first type of data traffic indicates that the data traffic is a type of equal or over the threshold of latency requirement e.g. requiring the delay to be below a set threshold. When the radio network node 12 receives this indication, the radio network node 12 may decide to maximize the amount of radio resources allocated for the UE 10. This indication is from here on referred to as a ForegroundTraffic indication. The ForegroundTraffic indication may be sent using a specific MAC CE or extended RAI. When the radio network node 12 receives the ForegroundTraffic indication the radio network node 12 may reconfigure the UE 10 with short DRX cycle. When the radio network node 12 receives the ForegroundTraffic indication and carrier aggregation (CA) is not setup for the UE, the radio network node 12 may configure CA. When the radio network node 12 receives the ForegroundTraffic indication and dual connectivity (DC) is not setup for the UE, the radio network node 12 may configure DC.

The method actions performed by the UE 10 for handling communication in the wireless communication network according to embodiments will now be described with reference to a flowchart depicted in FIG. 2B. The actions do not have to be taken in the order stated below, but may be taken in any suitable order. Actions performed in some embodiments are marked with dashed boxes.

Action 211. The UE 10 may determine the type of data traffic for communication of the UE. This may be based on screen usage at the UE 10 and/or application used. The type of data traffic may be determined based on a threshold level of a latency requirement of the data traffic. Type of data traffic may be defined as background data or foreground data.

Action 212. The UE 10 transmits the indication to the radio network node 12, indicating the type of data traffic for communication of the UE, wherein the type is related to the level of performance. The indication may indicate a level of latency requirement. The indication may indicate what type the UE 10 buffers for transmission or is expecting to receive, e.g. type and/or amount of data intended for communication. E.g. the data may be data that the UE is expecting to receive from its higher layers and which is to be sent to the network, and may also indicate the amount of data for which the UE expects to send for the duration of the RRC connected state. The indication may be sent using a Power Preference Indication (PPI) signalling indication, a specific MAC control element (CE) or extended Release Assistance Indication (RAI).

Figure 2C:
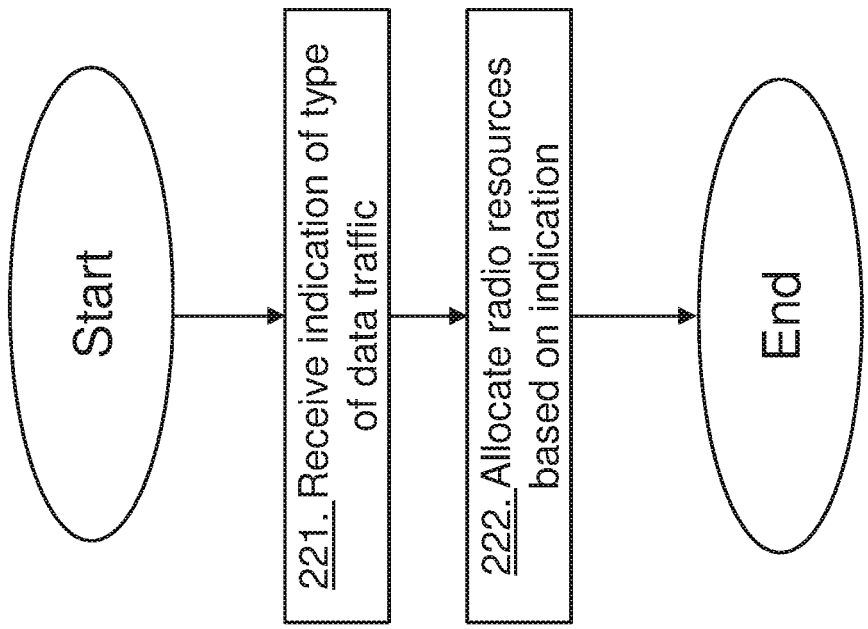
FIG. 2C shows a method performed by a radio network node according to embodiments herein.

The method actions performed by the radio network node for handling communication for the UE in the wireless communication network according to embodiments will now be described with reference to a flowchart depicted in FIG. 2C. The actions do not have to be taken in the order stated below, but may be taken in any suitable order. Actions performed in some embodiments are marked with dashed boxes.

Action 221. The radio network node receives the indication from the UE, indicating the type of data traffic for communication of the UE, wherein the type is related to a level of performance. The indication may indicate a level of latency requirement. The indication may be indicating level of screen usage at the UE and/or application used at the UE. The type of data traffic may be indicating a threshold level of a latency requirement of the data traffic. The indication may be either indicating background data or foreground data. The indication may comprise one or more of the following: a PPI signalling indication, a specific MAC CE, or an extended RAI.

Action 222. The radio network node allocates one or more radio resources for the UE based on the received indication. The radio network node may allocate the one or more resources by scheduling communication of the UE taking a priority of the UE into account, wherein the priority is based on the indication. The radio network node may allocate the one or more resources by further taking amount of data of the type of data traffic into account, e.g. amount of data intended for communication. The radio network node may allocate the one or more resources by setting up and/or releasing aggregated cells and/or dual connectivity. The radio network node may allocate the one or more resources by configuring the UE with the one cell on the lowest possible band and configuring minimum bandwidth on it when indication indicates a low latency requirement. The radio network node may allocate the one or more resources by performing a hand over the UE to a different RAT if it is assumed to be less power consuming for the UE. The radio network node may allocate the one or more resources by configuring DRX cycle for the UE based on the indication.

Figure 3:
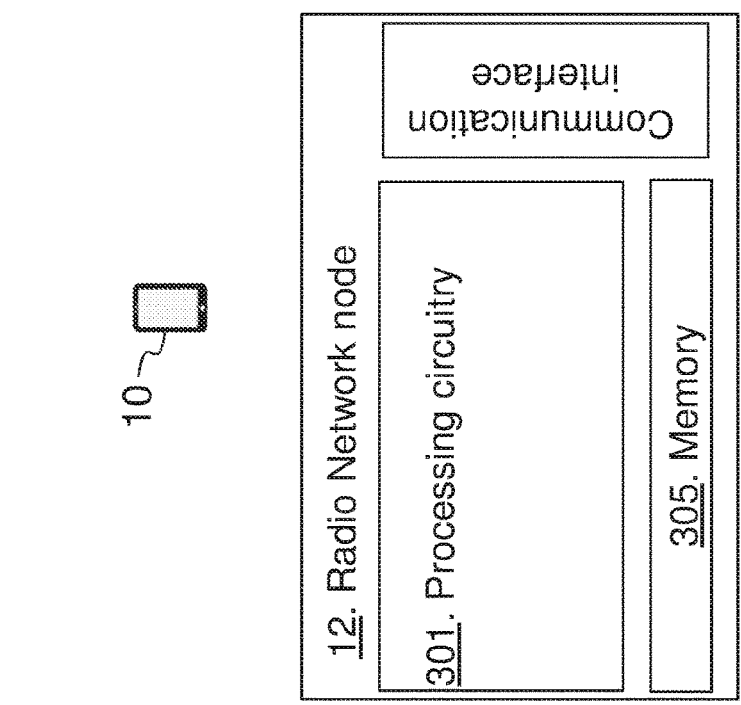
FIG. 3 shows a block diagram depicting a radio network node according to embodiments herein.
Figure 3:
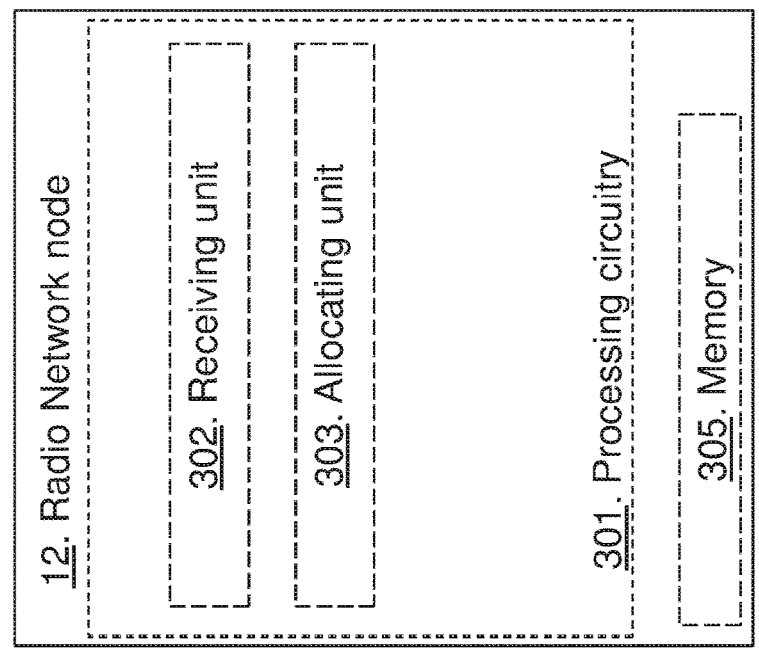
Figure 3:
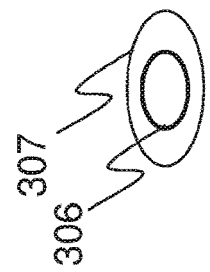

FIG. 3 is a block diagram depicting the radio network node 12, e.g. the first or the second radio network node, for handling communication such as transmission/reception for the UE 10 in the wireless communication network 1 according to embodiments herein.

The radio network node 12 such as a radio base station may comprise processing circuitry 301, e.g. one or more processors, configured to perform the methods herein.

The radio network node 12 may comprise a receiving unit 302, e.g. a receiver or transceiver. The radio network node 12, the processing circuitry 301 and/or the receiving unit 302 is configured to receive the indication, from the UE, indicating the type of data traffic for communication of the UE. E.g. indication of the first type of data traffic (or data) for communication of the UE. The type is related to the level of performance such as level of latency requirement. The indication may be indicating level of screen usage at the UE. The type of data traffic may be indicating the threshold level of the latency requirement of the data traffic. The indication may either be indicating background data or foreground data. The indication may comprise one or more of the following: a PPI signalling indication, a specific MAC CE, or an extended RAI.

The radio network node 12 may comprise an allocating unit 303, e.g. a scheduler. The radio network node 12, the processing circuitry 301 and/or the allocating unit 303 is configured to allocate one or more radio resources for the UE based on the received indication. The radio network node 12, the processing circuitry 301 and/or the allocating unit 303 may be configured to allocate the one or more resources by scheduling communication of the UE taking the priority of the UE into account, wherein the priority is based on the indication. The radio network node 12, the processing circuitry 301 and/or the allocating unit 303 may be configured to allocate the one or more resources by further taking amount of data of the type of data traffic into account. The radio network node 12, the processing circuitry 301 and/or the allocating unit 303 may be configured to allocate the one or more resources by setting up and/or releasing aggregated cells and/or dual connectivity. The radio network node 12, the processing circuitry 301 and/or the allocating unit 303 may be configured to allocate the one or more resources by configuring the UE with the one cell on the lowest possible band and configuring minimum bandwidth on it when indication indicates a low latency requirement. The radio network node 12, the processing circuitry 301 and/or the allocating unit 303 may be configured to allocate the one or more resources by performing a hand over the UE to a different RAT if it is assumed to be less power consuming for the UE. The radio network node 12, the processing circuitry 301 and/or the allocating unit 303 may be configured to allocate the one or more resources by configuring DRX cycle for the UE based on the indication.

The radio network node 12 further comprises a memory 305. The memory comprises one or more units to be used to store data on, such as indications, indications of type of data traffic for different UEs, DRX cycles, CA information, DC information, applications to perform the methods disclosed herein when being executed, and similar. Thus, the radio network node 12 may comprise the processing circuitry and the memory, said memory comprising instructions executable by said processing circuitry whereby said radio network node 12 is operative to perform the methods herein. The radio network node 12 may comprise a communication interface comprising a transmitter, a receiver, a transceiver and/or one or more antennas.

The methods according to the embodiments described herein for the radio network node 12 are respectively implemented by means of e.g. a computer program product 306 or a computer program, comprising instructions, i.e., software code portions, which, when executed on at least one processor, cause the at least one processor to carry out the actions described herein, as performed by the radio network node 12. The computer program product 306 may be stored on a computer-readable storage medium 307, e.g. a disc, a universal serial bus (USB) stick, or similar. The computer-readable storage medium 307, having stored thereon the computer program product 306, may comprise the instructions which, when executed on at least one processor, cause the at least one processor to carry out the actions described herein, as performed by the radio network node 12. In some embodiments, the computer-readable storage medium may be a non-transitory or a transitory computer-readable storage medium.

Figure 4:
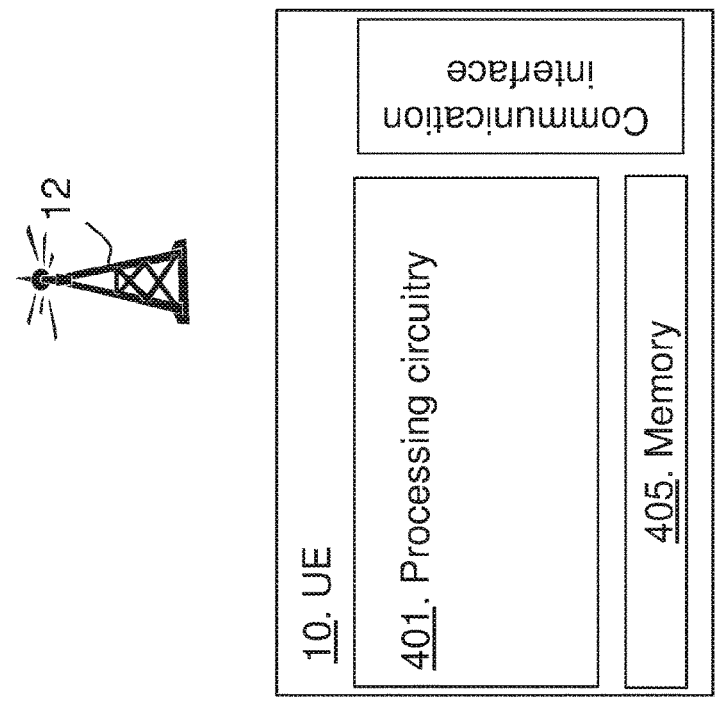
FIG. 4 shows a block diagram depicting a UE according to embodiments herein.
Figure 4:
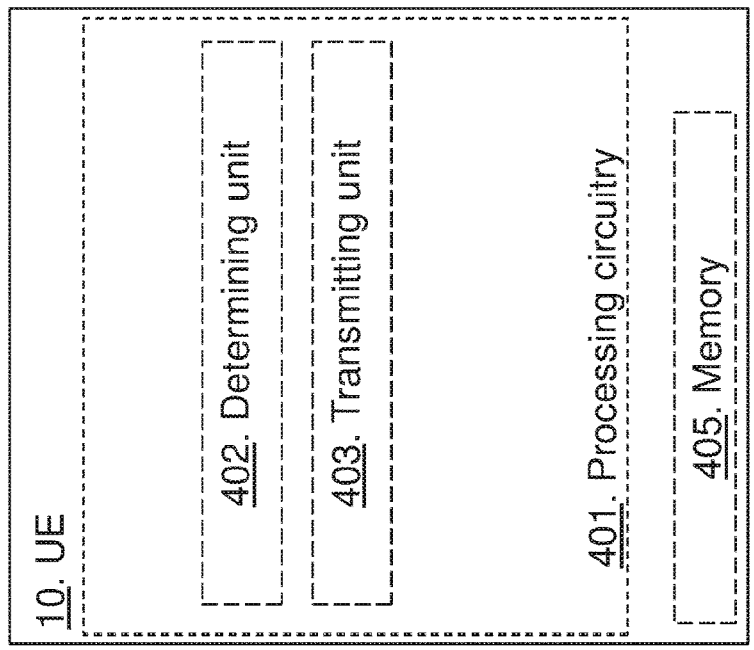
Figure 4:
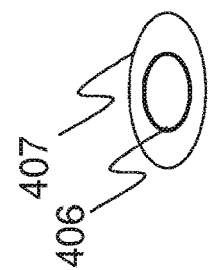

FIG. 4 is a block diagram depicting the UE 10 for handling communication in the wireless communication network 1 according to embodiments herein.

The UE 10 may comprise processing circuitry 401, e.g. one or more processors, configured to perform the methods herein.

The UE 10 may comprise a determining unit 402. The UE 10, the processing circuitry 401 and/or the determining unit 402 may be configured to determine the type of data traffic for communication of the UE. The UE 10, the processing circuitry 401 and/or the determining unit 402 may be configured to determine the type of data traffic based on screen usage or application at the UE. The type of data traffic may be determined based on the threshold level of the latency requirement of the data traffic.

The UE 10 may comprise a transmitting unit 403, e.g. a transmitter or transceiver. The UE 10, the processing circuitry 401 and/or the transmitting unit 403 is configured to transmit the indication to the radio network node 12, indicating the type of data traffic (or data) for communication of the UE, e.g. what type the UE buffers for transmission or is expecting to receive. The type is related to a level of performance such as level of latency requirement. The indication may indicate what type the UE buffers for transmission or is expecting to receive. Type of data traffic may be defined as background data or foreground data. The indication may be sent using a PPI signalling indication, a specific MAC CE, or an extended RAI.

The UE 10 further comprises a memory 405. The memory comprises one or more units to be used to store data on, such as indications, type of data traffic the UE is expecting to communicate, applications to perform the methods disclosed herein when being executed, and similar. Thus, the UE 10 may comprise the processing circuitry and the memory, said memory comprising instructions executable by said processing circuitry whereby said wireless device 10 is operative to perform the methods herein. The UE may comprise a communication interface comprising e.g. a transmitter, a receiver, a transceiver and/or one or more antennas.

The methods according to the embodiments described herein for the UE 10 are respectively implemented by means of e.g. a computer program 406 or a computer program product, comprising instructions, i.e., software code portions, which, when executed on at least one processor, cause the at least one processor to carry out the actions described herein, as performed by the UE 10. The computer program product 406 may be stored on a computer-readable storage medium 407, e.g. a disc, USB stick or similar. The computer-readable storage medium 407, having stored thereon the computer program product 406, may comprise the instructions which, when executed on at least one processor, cause the at least one processor to carry out the actions described herein, as performed by the UE 10. In some embodiments, the computer-readable storage medium may be a transitory or non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figure 5:
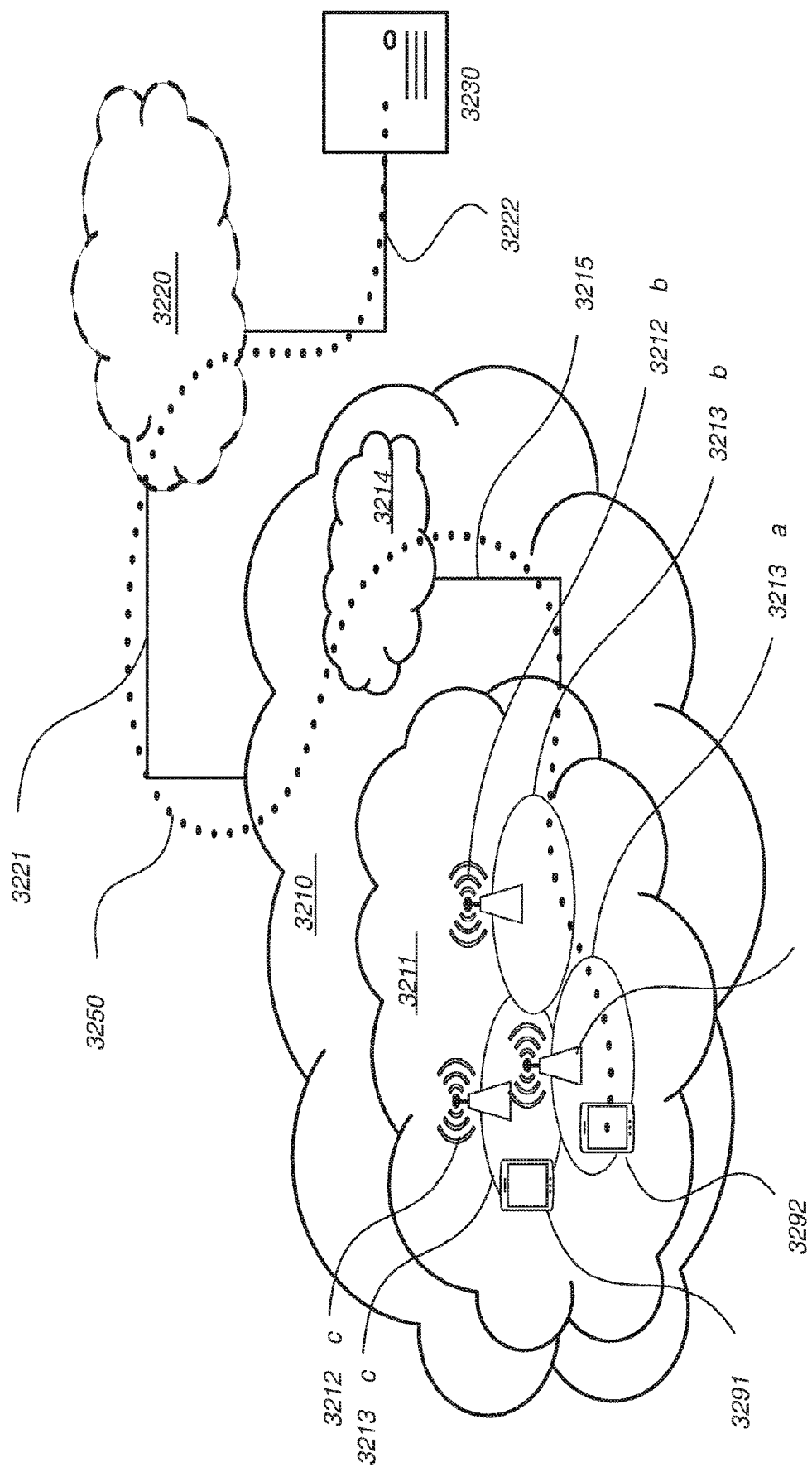
FIG. 5 is a schematic diagram depicting a telecommunication network connected via an intermediate network to a host computer.

With reference to FIG. 5, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network nodes herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the wireless device 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 6) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 6:
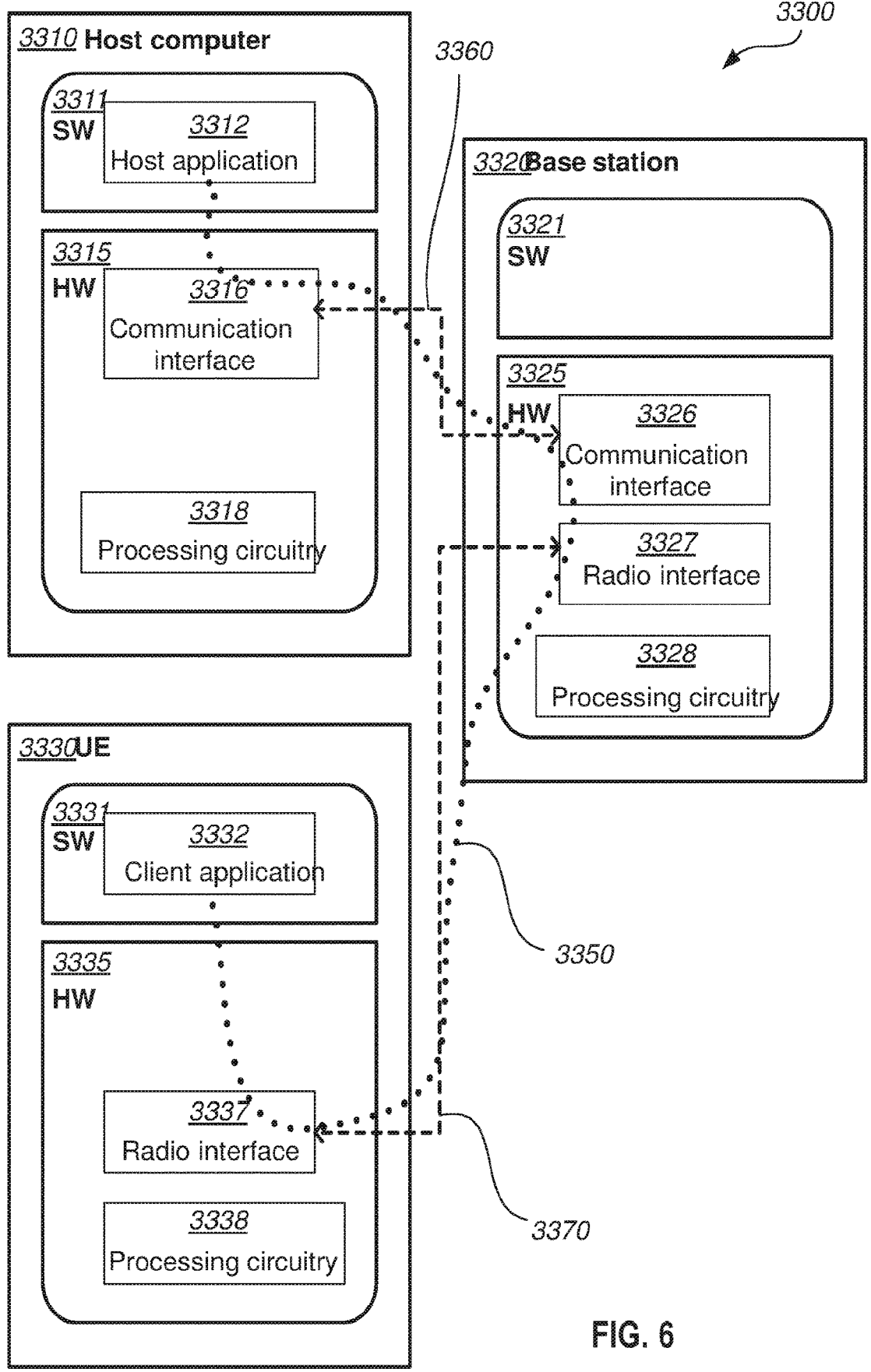
FIG. 6 is a generalized block diagram of a host computer communicating via a base station with a user equipment over a partially wireless connection.

It is noted that the host computer 3310, base station 3320 and UE 3330 illustrated in FIG. 6 may be identical to the host computer 3230, one of the base stations 3212*a*, 3212*b*, 3212*c* and one of the UEs 3291, 3292 of FIG. 5, respectively. This is to say, the inner workings of these entities may be as shown in FIG. 6 and independently, the surrounding network topology may be that of FIG. 5.

In FIG. 6, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve handling of radio resources efficiently and thereby provide benefits such as reduced user waiting time, and better responsiveness for other UEs.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 7, 8:
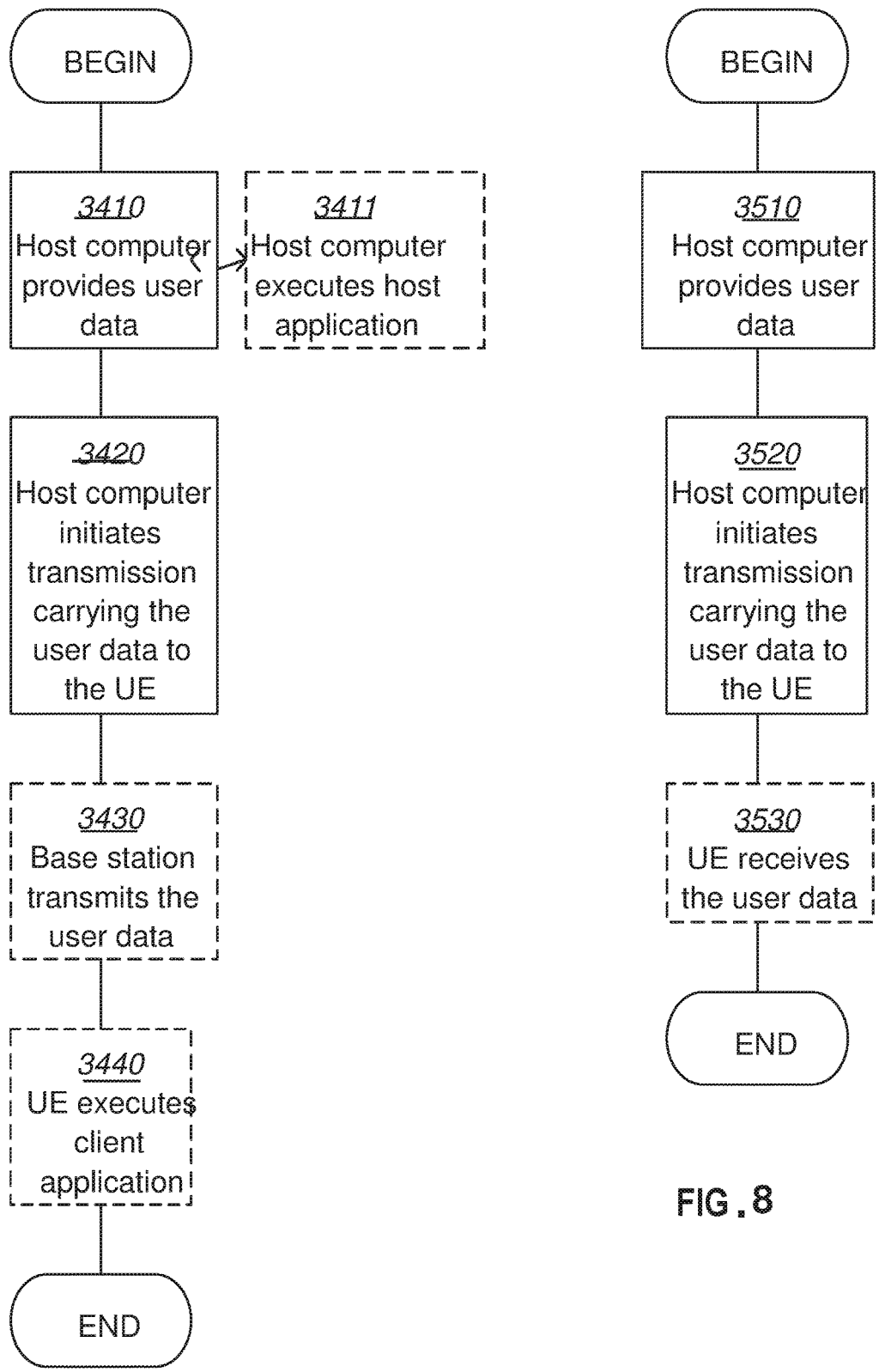

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment, UE, for handling communication in a wireless communication network, the method comprising:
   transmitting an indication to a radio network node, indicating a type of data traffic and an amount of data traffic intended for communication of the UE for a duration of radio resource control, RRC, connected state of the UE, wherein the type is related to a level of performance.

2. The method according to claim 1, wherein the indication indicates at least one of a level of latency requirement, what type the UE buffers for transmission or is expecting to receive.

3. The method according to claim 1 further comprising:
   determining the type of data traffic for communication of the UE.

4. The method according to claim 3, wherein determining the type of data traffic is based on screen usage at the UE.

5. The method according to claim 1, wherein the type of data traffic is determined based on a threshold level of a latency requirement of the data traffic.

6. The method according to claim 1, wherein type of data traffic is defined as background data or foreground data.

7. The method according to claim 1, wherein the indication is sent using a Power Preference Indication, PPI, signalling indication, a specific medium access control control element, MAC CE, or an extended Release Assistance Indication, RAI.

8. A method performed by a radio network node for handling communication for a UE in the wireless communication network, the method comprising:
receiving an indication from the UE, indicating a type of data traffic and an amount of data traffic intended for communication of the UE for a duration of radio resource control, RRC, connected state of the UE, wherein the type is related to a level of performance; and
allocating one or more radio resources for the UE based on the received indication.

9. The method according to claim 8, wherein the indication indicates at least one of a level of latency requirement, a level of screen usage at the UE.

10. The method according to claim 8, wherein the type of data traffic is indicating a threshold level of a latency requirement of the data traffic.

11. The method according to claim 8, wherein the indication is either indicating background data or foreground data.

12. The method according to claim 9, wherein the indication comprises one or more of the following: a Power Preference Indication, PPI, signalling indication, a specific medium access control control element, MAC CE, or an extended Release Assistance Indication, RAI.

13. The method according to claim 9, wherein allocating the one or more resources comprises one or more of scheduling communication of the UE taking a priority of the UE into account, wherein the priority is based on the indication, taking amount of data of the type of data traffic into account,
setting up and/or releasing aggregated cells and/or dual connectivity,
configuring the UE with the one cell on the lowest possible band and configuring minimum bandwidth on it when indication indicates a low latency requirement,
performing a hand over the UE to a different radio access technology, RAT, if it is assumed to be less power consuming for the UE,
configuring discontinuous reception, DRX, cycle for the UE based on the indication.

14. A non-transitory computer-readable memory comprising instructions, which, when executed on at least one processor, cause the at least one processor to carry out the method according to claim 1, as performed by the UE or the radio network node, respectively.

15. A computer-readable storage memory, having stored thereon a computer program product comprising instructions which, when executed on at least one processor, cause the at least one processor to carry out the method according to claim 1, as performed by the UE or the radio network node, respectively.

16. A user equipment, UE, for handling communication in a wireless communication network, wherein the UE is configured to:
transmit an indication to a radio network node, indicating a type of data traffic and an amount of data traffic intended for communication of the UE for a duration of radio resource control, RRC, connected state of the UE, wherein the type is related to a level of performance.

17. The UE according to claim 16, wherein the indication indicates at least one of a level of latency requirement,
what type the UE buffers for transmission or is expecting to receive.

18. The UE according to claim 16, wherein the UE is further configured to:
determine the type of data traffic for communication of the UE.

19. A radio network node for handling communication for a user equipment, UE, in a wireless communication network, wherein the radio network node is configured to:
receive an indication from the UE, indicating a type of data traffic and an amount of data traffic intended for communication of the UE for a duration of radio resource control, RRC, connected state of the UE, wherein the type is related to a level of performance; and
allocate one or more radio resources for the UE based on the received indication.

20. The radio network node according to claim 18, wherein the indication indicates at least one of a level of latency requirement,
a level of screen usage at the UE.

* * * * *